US009207888B2

(12) United States Patent
Tsongas et al.

(10) Patent No.: US 9,207,888 B2
(45) Date of Patent: Dec. 8, 2015

(54) SYSTEMS AND METHODS FOR DETECTING CUSTOMER COST/CONTRACT AVOIDANCE IN OPERATION OF IMAGE FORMING DEVICES

(71) Applicant: XEROX Corporation, Norwalk, CT (US)

(72) Inventors: Jason C. Tsongas, Rochester, NY (US); Matthew O. Scrafford, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 87 days.

(21) Appl. No.: 14/082,208

(22) Filed: Nov. 18, 2013

(65) Prior Publication Data

US 2015/0138584 A1    May 21, 2015

(51) Int. Cl.
*G06F 3/12* (2006.01)

(52) U.S. Cl.
CPC .............. *G06F 3/121* (2013.01); *G06F 3/1234* (2013.01); *G06F 3/1259* (2013.01); *H04N 2201/0081* (2013.01); *H04N 2201/0091* (2013.01); *H04N 2201/0093* (2013.01); *H04N 2201/0094* (2013.01)

(58) Field of Classification Search
None
See application file for complete search history.

(56) References Cited

U.S. PATENT DOCUMENTS

| 2003/0126585 | A1* | 7/2003 | Parry | 717/124 |
|---|---|---|---|---|
| 2006/0103866 | A1* | 5/2006 | Saka et al. | 358/1.13 |
| 2007/0146743 | A1* | 6/2007 | Karn et al. | 358/1.9 |
| 2008/0180711 | A1* | 7/2008 | Ebuchi | 358/1.12 |
| 2009/0009803 | A1* | 1/2009 | Takeuchi et al. | 358/1.15 |
| 2010/0188680 | A1* | 7/2010 | Xiao | 358/1.13 |
| 2011/0242580 | A1* | 10/2011 | Tran | 358/1.15 |
| 2012/0026515 | A1* | 2/2012 | Muramoto | 358/1.2 |
| 2013/0088734 | A1* | 4/2013 | Kim | 358/1.13 |

\* cited by examiner

*Primary Examiner* — Ming Hon
(74) *Attorney, Agent, or Firm* — Ronald E. Prass, Jr.; Prass LLP

(57) ABSTRACT

A system and method are provided for methods for automatically detecting certain incidents in which customers attempt to circumvent costs associated with their managed service contracts for operations of image forming devices. Current monitoring capacities associated with fielded image forming devices are expanded to provide device manufacturers or suppliers with an opportunity to detect attempts at customer cost avoidance through printing on larger paper sizes. User actions that contravene certain requirements of the managed service agreement are detected. At a point of detection, the user is provided with certain alternatives for remediation or contract compliance. These alternatives include, but are not limited to, offering the user the opportunity to cancel the print job, print the print job on "right" sized paper, or otherwise to accept a calculation of the actual printing costs involved in, for example, printing two pages on a single larger sheet, when detected.

22 Claims, 3 Drawing Sheets

SYSTEMS AND METHODS FOR DETECTING CUSTOMER COST/CONTRACT AVOIDANCE IN OPERATION OF IMAGE FORMING DEVICES

BACKGROUND

1. Field of the Disclosed Embodiments

This disclosure relates to systems and methods for automatically detecting certain incidents in which customers attempt to circumvent costs associated with their managed service contracts for operations of image forming devices.

2. Related Art

Image forming device manufacturers and suppliers make extensive beneficial use of capabilities to remotely monitor and track characteristics regarding status and operations of image forming devices operated by end-users, including customers or customer organizations, often under conditions of a managed services agreement or contract.

Remote monitoring can be used to detect faults in fielded image forming devices. Based on a detection of one or more faults, a remote determination may be made by the device manufacturer of supplier to alert the end-user regarding the fault condition and what, if any, remedial actions the end-user may undertake to clear the fault condition. For example, a determination may be made as to whether the end-user can undertake local remedial action to clear the fault (potentially with instructions forwarded by a particular device manufacturer or supplier), or whether customer service personnel and/or maintenance technicians associated with the particular device manufacturer or supplier should be dispatched to perform the remedial actions, which may include maintenance and/or upgrades, to clear the fault.

Separately and/or additionally, remote monitoring can be used to track an operating status, life cycle status or actual or pending exhaustion status of one or more customer replaceable units (CRUs) or expendables in the image forming device. The device manufacturer or supplier is provided alerts regarding pending exhaustion or end-of-service life conditions in certain components to facilitate resupply of those components to the end-user on an "as needed" or "just-in-time" basis, obviating a need for the customer or customer organization to maintain an on-hand supply of particular customer replaceable components, including expendables.

Monitored characteristics can include static information, i.e., information that does not routinely change during normal operation of the image forming device, such as a model or serial number and/or a compatibility of a particular CRU with the image forming device. Monitored characteristics can also include dynamically changing information relating to one or more particular characteristics of the image forming device and/or installed components, including CRUs. The dynamically changing information includes, for example, information on use, maintenance, failures, diagnostics, remanufacture, and remaining service life or expendables levels of certain components in the image forming device.

Local and remote monitoring capabilities can provide an invaluable link between (1) the customers and customer organizations, and (2) the device manufacturers and suppliers once the image forming devices are fielded. The information in and from the image forming devices, and any installed components, is transmitted to a device manufacturer or supplier on an as available basis, a scheduled basis or in response to a particular query from the device manufacturer or supplier. The remote monitoring relieves the end-user of the burdens associated with monitoring device operations, and allows the device manufacturer or supplier to provide technical, maintenance, resupply and other services, including, for example, even facilitating correct billing for operation of, and services associated with, each individually fielded image forming device that is overseen as part of a managed service contract.

In image forming devices, systems for communicating with and/or remotely diagnosing the status of widely-dispersed devices are well-known. The image forming devices communicate via any manner of wired or wireless communication link with network interfaces such as, for example, via telephone lines, local area networks, and/or the Internet, in order to provide, for example, a remote device manufacturer or supplier service center with access to the image forming device in order to read status and/or diagnostic information produced by the image forming device and components installed in the image forming device. Remote and widely dispersed access is thus implemented such that an operator, supplier, manufacturer, diagnostic technician or other individual whose duties may require access to information regarding the status of the image forming device, or of any replaceable component operating within the image forming device, can review the information that they need and potentially organize responsive actions for device maintenance and/or error correction or avoidance.

SUMMARY OF THE DISCLOSED EMBODIMENTS

As an ability to communicate with image forming devices, and the components installed in those image forming devices, from remote locations continues to mature, device manufacturers and suppliers continue to seek ways to employ this communication ability to their benefit and to the benefit of their customers, customer organizations and/or end-users, particularly when it comes to system and/or supply support for the customers, customer organizations and/or end-users.

Companies that manufacture, sell and supply image forming devices often structure their managed service agreements with their customers and customer service organizations based on certain operating conditions, characteristics or parameters. These device manufacturers and suppliers, for example, generate substantial post-sale revenue from the separate business of selling authorized and compatible replacement components to the customers, customer organizations and/or end users to which they previously sold the image forming devices. Based on the significant revenue that may be available in the marketplace for replacement consumables, for example, recent years have witnessed a significant growth in companies whose sole business is to manufacture, remanufacture, refurbish, refill, or otherwise produce counterfeit or copies of (often referred to as "gray" market) replacement consumables for use in other companies' image forming devices. The steep increase in the growth of companies manufacturing and selling "gray" market components adversely affects the businesses of the device manufacturers and suppliers.

In attempting to employ "gray" market components, customers and customer organizations may seek what they consider to be a "better" post-sale deal, often in direct contravention of certain requirements of the agreements (managed service contracts) that may have gotten them a "better" deal on the purchase price at the time of purchase of the image forming devices for customers and/or end-users. There are measurable economic effects based on the loss of revenue from the customers and customer organizations purchasing replacement consumables from sources other than the device manufacturers or suppliers. More subtle too are certain intangibles such as the potential for an impact on the reputation of the device manufacturers in instances where, for example, specific customers experience poor image quality for images produced on a particular image forming device without recognizing that the fault may lie not with the image forming device itself, but rather with the quality of the less-than-optimally-compatible replacement consumables that have been procured from other sources and installed in the image forming device.

In the above scenario, therefore, device manufacturers and suppliers have a significantly vested interest in attempting to combat the use of "gray" market replacement consumables in their image forming devices. In order to combat the proliferation of "gray" market components, device manufacturers and suppliers have implemented affirmative steps to combat the adverse effects on their revenue streams and reputations. The schemes employed by the device manufacturers may include contractual schemes such as specifically warning their customers that the use of non-company manufactured replacement consumables in a particular image forming device will invalidate any warranty protection on the image forming device, and could result in actions for breach of contract. There will remain, however, customers and/or end-users that are willing to accept these risks as a trade-off for potential cost savings and other incentives that may be associated with procuring and using "gray" market replacement consumables.

In an effort to make the use of "gray" market components even less attractive, device manufacturers have begun to rely on increasingly sophisticated compatibility matching techniques and schemes to address the issue. Myriad strategies exist, and new strategies are emerging, for "marking" authorized and compatible replacement components and consumables in ways that are designed to thwart the efforts of producers and consumers of counterfeit or copied products. These strategies often include mechanisms by which the replacement consumables and the devices into which they are installed are made to "communicate." The devices are programmed to "recognize" only authorized and compatible replacement components produced by, or under a license with, the device manufacturer. For example, extensive beneficial use is made of capabilities to externally monitor operating conditions of myriad customer replaceable components or units, and consumables via the containers in which the consumables are provided, in all manner of devices. Externally or remotely electronically-readable monitoring modules associated with the customer replaceable components or units, or consumables containers, may provide a monitoring function for monitoring one or more characteristics of the customer replaceable component or unit, or the consumable.

Device manufacturers and suppliers are provided increasing capabilities by which to control configurations and to identify authorized CRUs in a manner that may promote customer compliance with managed service contracts while reducing the use of non-authorized and/or non-compliant counterfeit or copied CRUs in image forming devices. U.S. Patent Application Publication No. 2012/0254050 A1 to Scrafford et al., having overlapping inventorhip with this application and being co-assigned to the Assignee for this application, the disclosure of which is hereby incorporated by reference herein in its entirety, discloses a system and method for validating and tracking CRUs in an effort to address instances in the industry where it may be considered particularly advantageous to attempt to ensure that CRUs are authentic and that the CRUs meet device manufacturers' operational specifications. Scrafford et al. note that actions of copiers and counterfeiters, including reconfiguring or copying CRUMs, create significant problems affecting not only profits for the manufacturers and legitimate suppliers/resellers, but also brand reputation when customers become dissatisfied over product functionality risks and reduced image quality in particular image forming devices introduced through the use of non-compatible and/or unauthorized CRUs in the image forming devices. Other techniques continue to emerge.

As device manufacturers and suppliers implement schemes for unauthorized CRU identification and remediation, end-users of image forming devices have become creative in attempting to avoid other costs associated with image forming device operations, particularly those imposed under managed service agreements. Many post-sale operations performed by end-users are billed according to "per page" print costs. One technique by which to avoid the accrual of these print costs has been found and implemented by end-users printing jobs that are correctly intended for smaller-sized papers, e.g., 8.5" by 11", on larger-sized papers, e.g., 11" by 17", and then cutting the larger-sized papers down to the smaller size. This technique effectively avoids certain "per page" print costs in their managed service agreements in which the device manufacturer or supplier bills the customer on a per sheet basis without taking into account the size of the paper used.

It would be advantageous to expand current monitoring capacities associated with fielded image forming devices to provide device manufacturers or suppliers with an opportunity to detect attempts at customer cost avoidance through printing on larger paper sizes.

Exemplary embodiments of the systems and methods according to this disclosure may implement techniques to detect a particular form of customer cost avoidance by printing on larger paper sizes than warranted by the specifications of a particular print job.

Exemplary embodiments may detect user actions that contravene certain requirements of the managed service agreement in the above regard and offer the user certain alternatives for remediation or contract compliance. These alternatives may include, but are not limited to, offering the user the opportunity to cancel the print job, print the print job on "right" sized paper, or otherwise to accept a calculation of the actual printing costs involved in, for example, printing two pages on a single larger sheet, when detected.

Exemplary embodiments may leverage existing printing software and technologies available on some devices that allow for incrementing counters based on paper sizes used. These counters may not be replaced, but their outputs may be made remotely readable to expand a device manufacturer's ability to properly bill based on page usage to those devices which today do not offer such technology.

Exemplary embodiments may be alerted to a potential for misuse by detecting prints of a larger size and employing a review scheme to determine a content of the prints. The review scheme may review such prints for a) n-up printing or b) obvious gutter areas suggesting the intent of printing more than one page of a smaller size on a larger sheet of paper.

Exemplary embodiments may seek to additionally protect the revenue streams of the device manufacturers and suppliers in a managed service environment by properly billing customers for their actual usage of the image forming devices.

Exemplary embodiments may provide overall increased customer satisfaction through better control of a user's printing activity and control of costs, allowing a customer to better understand and deal with issues in its environment to control costs.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for automatically detecting incidents in which customers may attempt to circumvent costs associated with certain managed service contracts for operations of image forming devices, will be described, in detail, with reference to the following drawings, in which.

DETAILED DESCRIPTION OF THE DISCLOSED EMBODIMENTS

Figure 1:
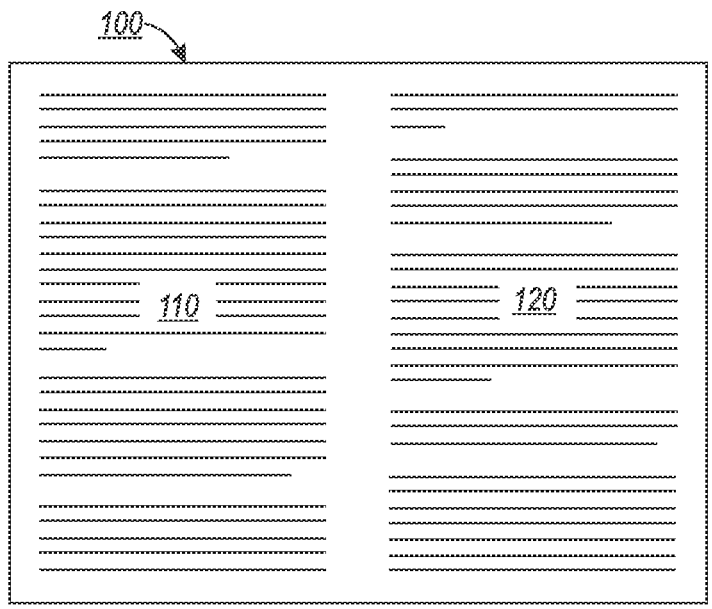
FIG. 1 illustrates an example of a produced image that may be addressed by the systems and methods according to this disclosure.

The systems and methods for automatically detecting incidents in which customers may attempt to circumvent costs associated with certain managed service contracts for operations of image forming devices according to this disclosure will generally refer to this specific utility for those systems and methods. Exemplary embodiments described and depicted in this disclosure should not be interpreted as being specifically limited to any particular configuration of a device for implementing a detection and remediation technique or scheme, or directed to any particular limiting intended use. In fact, any detection and/or remediation scheme that may benefit from the systems and methods according to this disclosure is contemplated.

Specific reference to, for example, any particular image forming device, including but not limited to any of a printer, copier, scanner, facsimile machine or multi-function device, should be understood as being exemplary only, and not limited, in any manner, to any particular class of such devices. The systems and methods according to this disclosure will be described as being particularly adaptable to use in printing and/or copying devices that produce output images according to input data and instructions that may be transmitted to a particular printing and/or copying device, but should not be considered as being limited to only these types of devices. Any commonly known image forming device capable of communicating with a remote computing/monitoring device via a network communication system that may be adapted according to the specific capabilities discussed in this disclosure is contemplated.

The disclosed embodiments may be advantageously operated to detect a configuration of an image that is intended to be printed on an image receiving medium substrate. A basic image information discrimination methodology may be applied to determine whether the intended or commanded printing configuration includes discernible characteristics to indicate that the overall image is intended to be printed on a single sheet, that the overall image is commanded to be a composite of multiple single page images printed on a larger sheet. The basic discrimination methodology may involve an evaluation of gutters and blank spaces that may be present in a finished image, as well as an evaluation as to whether the commanded or intended image is a draft image, potentially intended to display multiple pages on a single sheet for review, or a final image set that appears to be formatted for smaller-sized individual sheets, but that is manipulated in a manner to be produced, in final form, on a larger sheet as multiple single page images. The basic discrimination methodology may at least be sophisticated enough to discern whether, based on the presence of certain gutters, margins, blank spaces and other characteristics, the commanded or intended image is a single page, multiple column image or whether the commanded or intended image is actually an improper multi-page image.

Figure 2:
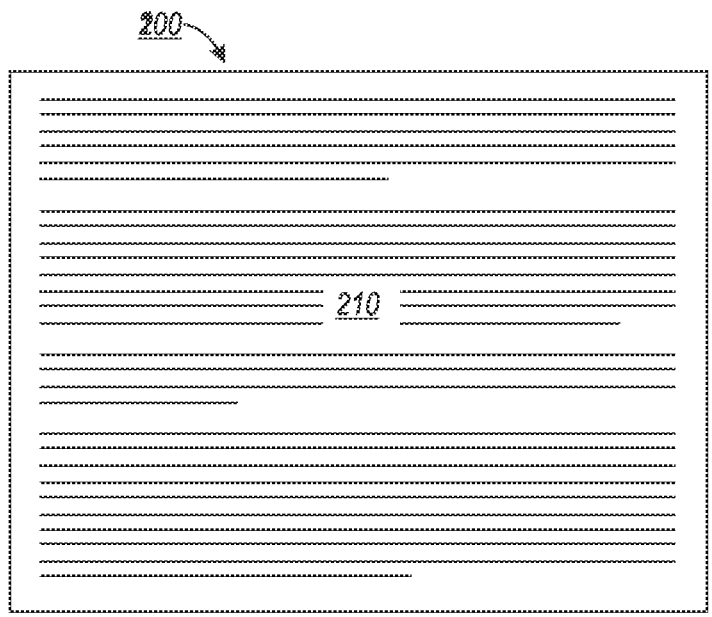
FIG. 2 illustrates a comparative example of a produced image that may not need to be addressed by the systems and methods according to this disclosure.

Contrast the depictions provided in FIGS. 1 and 2. FIG. 1 illustrates an example of a produced image 100 that may be addressed by the systems and methods according to this disclosure. As shown in FIG. 1, what appears to be two separate pages of text 110 and 120 are shown. Of note for discrimination purposes in that the central white space or gutter between the two separate pages of text 110 and 120 is twice the width of any of the edge white spaces or gutters between any "outer" edge of the two separate pages of text 110 and 120 and the actual edge of the image receiving media substrate on which the two separate pages of text are formed. FIG. 2 illustrates a comparative example of a produced image 200 that may not need to be addressed by the systems and methods according to this disclosure. This is a simple example because the page of text 210 clearly spans a substantially entire width of the image receiving media substrate. The disclosed systems and methods could easily discern between the depictions in FIGS. 1 and 2. The subtlety of the disclosed scheme resides, for example, in an ability to discern between the depiction in FIG. 1 and a two column depiction of the page of text 210 in FIG. 2. It would be expected that a width the white space, or gutters, between the columns of a two column presentation of the page of text 210 in FIG. 2 would be substantially equal to the gutters or white space at the outer edges of the page of text 210 as opposed to being twice the width of any of the edge white spaces or gutters between any outer edge of the two separate pages of text 110 and 120 and the actual edge of the image receiving media substrate on which the two separate pages of text are formed as shown in FIG. 1. Increasingly sophisticated detection methodologies may be applicable depending on the level of discrimination that a particular device manufacturer or user may desire.

Figure 3:
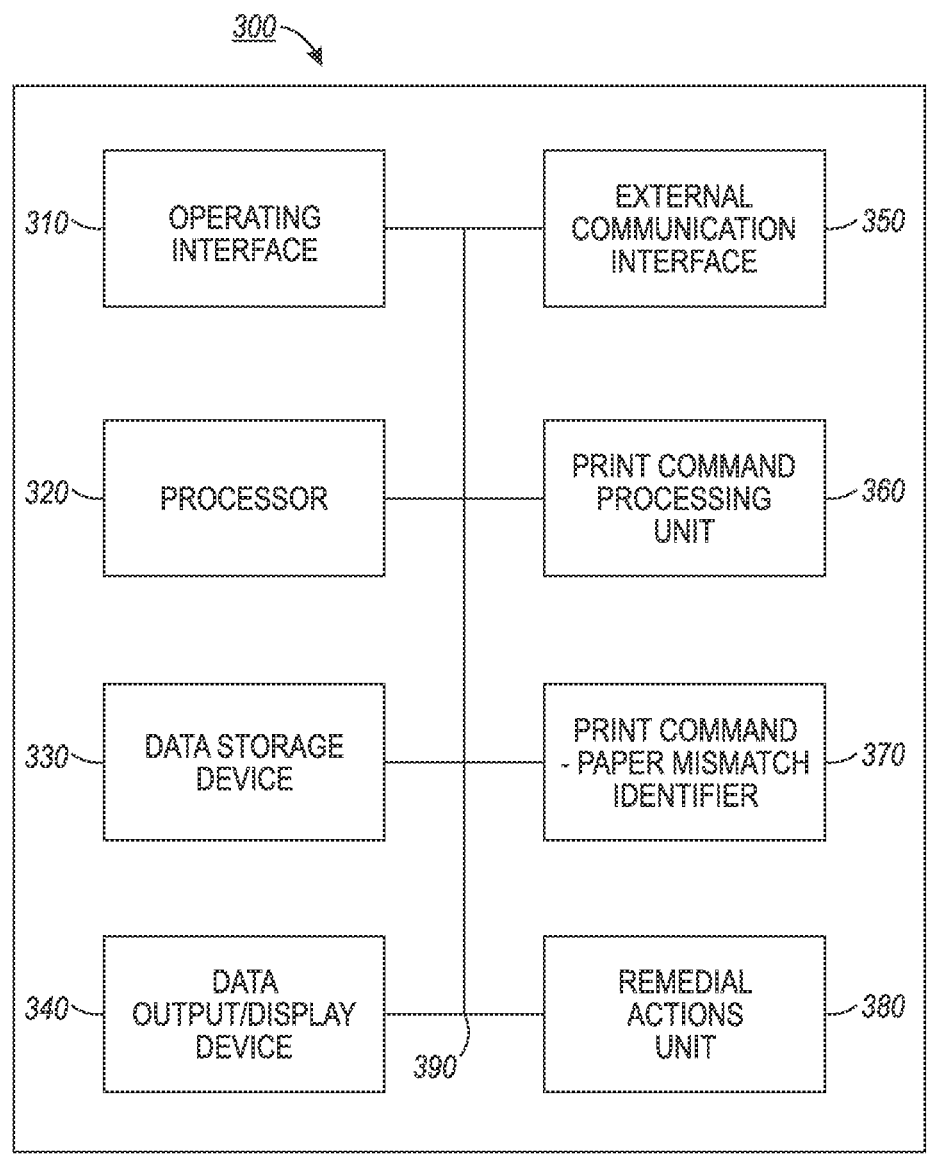
FIG. 3 illustrates a block diagram of an exemplary system for automatically detecting and responsively addressing incidents in which customers may attempt to circumvent costs associated with certain managed service contracts for operations of image forming devices according to this disclosure.

FIG. 3 illustrates a block diagram of an exemplary system 300 for automatically detecting and responsively addressing incidents in which customers may attempt to circumvent costs associated with certain managed service contracts for operations of image forming devices according to this disclosure. Components of the exemplary system 300 shown in FIG. 3 may be, for example, housed at an end-user location in a server or in one or more of the image forming devices that may be monitored and managed by a device management application.

The exemplary system 300 may include an operating interface 310 by which a user may communicate with the exemplary system 300, or otherwise by which the exemplary system 300 may receive instructions input to it from another source. In instances where the operating interface 310 may be a locally accessible user interface, the operating interface 310 may be configured as one or more conventional mechanisms common to computing and/or image forming devices that permit a user to input information to the exemplary system 300. The operating interface 310 may include, for example, a conventional keyboard and mouse, a touchscreen with "soft" buttons or with various components for use with a compatible stylus, a microphone by which a user may provide oral commands to the exemplary system 300 to be "translated" by a voice recognition program, or other like device by which a user may communicate specific operating instructions to the exemplary system 300.

The exemplary system 300 may include one or more local processors 320 for individually operating the exemplary system 300 and for carrying out processing, assessment, reporting and control functions. Processor(s) 320 may include at least one conventional processor or microprocessor that interprets and executes instructions to direct specific data monitoring and analysis functions with regard to image data that is commanded or intended to direct image forming in a specific image forming device. Processor(s) 220 may initiate and control of certain data collection, analysis and remediation efforts with respect to commanded or intended image data in an image forming device with which the exemplary system 300 may be associated.

The exemplary system 300 may include one or more data storage devices 330. Such data storage device(s) 330 may be used to store data or operating programs to be used by the exemplary system 300, and specifically the processor(s) 320, in carrying out the image data analysis and remediation functions of the exemplary system 300. Data storage device(s) 330 may be used to collect information regarding any or all of the functions of the exemplary system 300, as described above. The data storage device(s) 330 may include a random access memory (RAM) or another type of dynamic storage device that is capable of storing collected information, and separately storing instructions for execution of system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary system 300, or may be provided external to, and in wired or wireless communication with, the exemplary system 300.

The exemplary system 300 may include at least one data output/display device 340 which may be configured as one or more conventional mechanisms that output information to a user, including a display screen on a computing or image forming device, including a graphical user interface (GUI) on the image forming device. The data output/display device 340 may be usable to display to a user an indication of non-acceptance of image forming data that may be evaluated to indicate a detected discrepancy between a particular configuration for image forming directed by a specific print command and a size of a paper that is directed by the print command to accept the particular configuration of the image. The data output/display device 340 may then be usable, in conjunction with the operating interface 310 to display to a user a series of remediation options to resolve the detected discrepancy. Such remediation options may include, for example, an opportunity to a) cancel the commanded print job, b) reconfigure the commanded print job so as to be, for example, split into its appropriate smaller sizes and output on the appropriately sized media, or c) accept an additional charge (and perhaps some level of surcharge) associated with printing, for example, a detected multiple page document on a single image receiving media substrate of a larger size, according to the scenarios outlined above.

The exemplary system 300 may include one or more separate external communication interfaces 350 by which the exemplary system 300 may communicate with components external to the exemplary system 300, such as a monitored image forming device with which the exemplary system 300 may be associated. At least one external communication interface 350 may be configured specifically to facilitate communication between the exemplary system 300 and one or more monitored image forming devices to provide image forming operation data tracking and specific remediation options, which may include inhibiting operation of the one or more image forming devices upon detection of a data discrepancy, as discussed above, and before selection of an appropriate remediation option by a user. No particular limiting configuration to the external communication interface(s) 350 is to be implied by the depiction in FIG. 3, other than that the external communication interface(s) 350 may be configured to connect to external components via one or more available wired or wireless communication links.

The exemplary system 300 may include a print command processing unit 360, which may be a part or a function of processor 320 coupled to, for example, one or more storage devices 330, or may be a separate stand-alone component module or circuit in the exemplary system 300. The print command processing unit 360 may review data destined for one or more image forming devices separating data content from print instructions according to known means.

The exemplary system 300 may include a print command—paper mismatch identifier 370 with which the exemplary system 300 may apply one or more available detection methods to determine whether a print command is intended to circumvent, for example, proper per page printing costs in the image forming device to which the processed print command is directed. Again here, the print command—paper mismatch identifier 370 which be a part or a function of processor 320 coupled to, for example, one or more storage devices 330, or may be a separate stand-alone component module or circuit in the exemplary system 300. Using existing software for print job handling, the exemplary system 300, via the print command—paper mismatch identifier 370 may detect prints of a larger size, e.g., 11"×17", and further review such prints for certain characteristics in the print commands, such as a) n-up printing or b) obvious gutter areas suggesting the intent of printing more than one page of a smaller size on a larger sheet of paper. Intended column printing would be detected differently in the print commands than 2-up printing, for example.

The exemplary system 300 may include a remedial actions unit 380. Once a potential mismatch is identified, for example, the remedial actions unit, may simply inhibit further printing and display a fault or error message to a user. Preferably, the remedial actions unit 380 may provide the user with a range of options by which to clear the detected mismatch. These actions may include, but not be limited to, offering the user options for processing of the print job that consist of a) cancelling the print job; b) having the print job split into its appropriate smaller sizes and output on the appropriately sized media; and/or c) accepting an additional charge associated with completing the print job, as commanded, at a higher per page (per sheet) rate. The remedial actions unit 380 may direct the display of a range of options to the user on the data output/display device 340 and may accept a user selection of a particular one of the displayed range of options via user manipulation of the operating interface 310.

All of the various components of the exemplary system 300, as depicted in FIG. 3, may be connected by one or more data/control busses 390. These data/control busses 390 may provide wired or wireless communication between the various components of the exemplary system 300, whether all of those components are housed integrally in, or are otherwise external and connected to, the exemplary system 300.

It should be appreciated that, although depicted in FIG. 3 as what appears to be an integral unit, the various disclosed elements of the exemplary system 300 may be arranged in any combination of sub-systems as individual components or combinations of components, integral to a single unit, or external to, and in wired or wireless communication with the single unit of the exemplary system 300. In other words, no specific configuration as an integral unit or as a support unit is to be implied by the depiction in FIG. 3. Further, although depicted as individual units for ease of understanding of the details provided in this disclosure regarding the exemplary system 300, it should be understood that the described functions of any of the individually-depicted components may be undertaken, for example, by one or more processors 320 connected to, and in communication with, one or more data storage devices 330.

Figure 4:
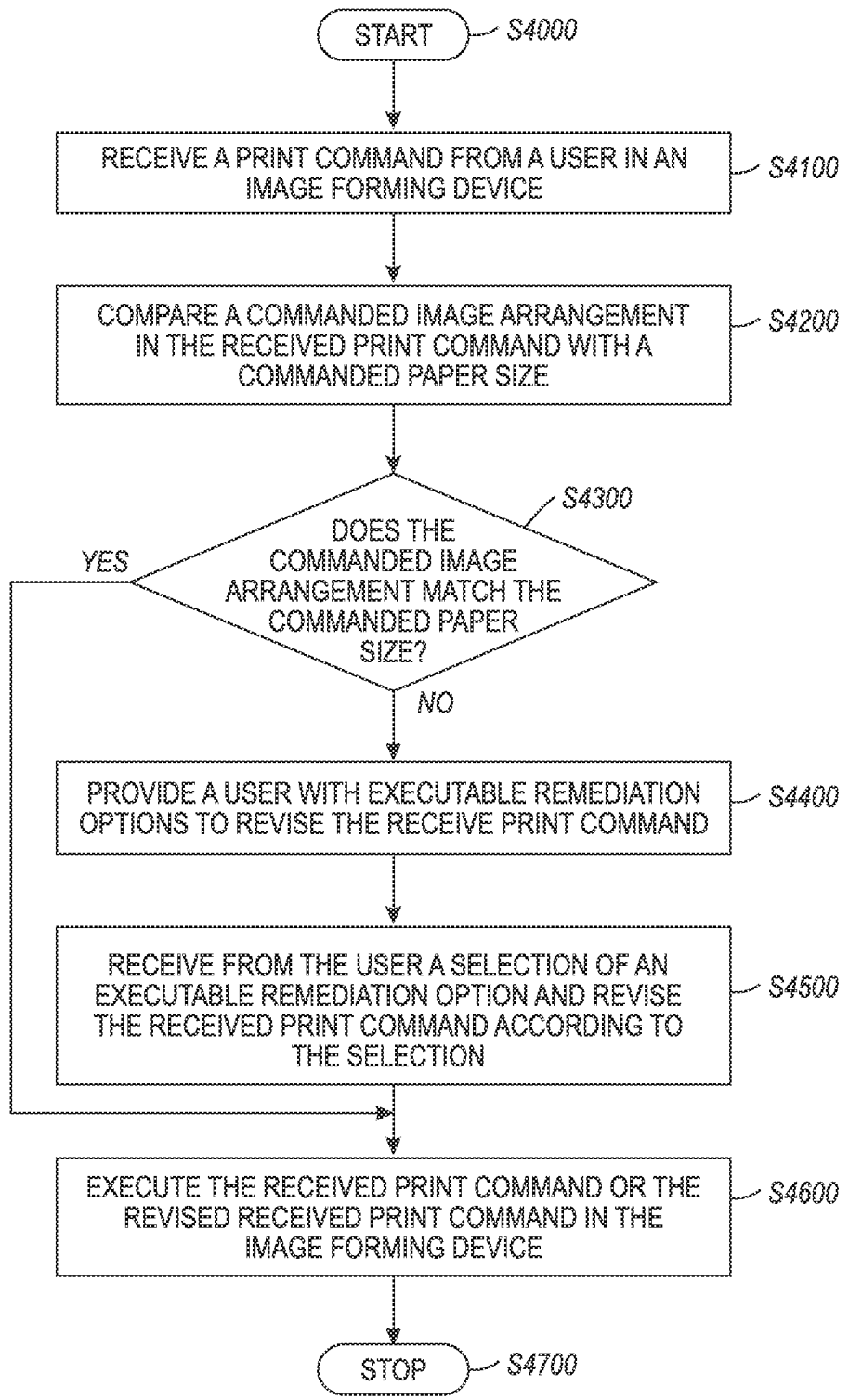
FIG. 4 illustrates a flowchart of an exemplary method for automatically detecting and responsively addressing incidents in which customers may attempt to circumvent costs associated with certain managed service contracts for operations of image forming devices according to this disclosure.

The disclosed embodiments may include an exemplary method for automatically detecting and responsively addressing incidents in which customers may attempt to circumvent costs associated with certain managed service contracts for operations of image forming devices. FIG. 4 illustrates a flowchart of such an exemplary method. As shown in FIG. 4, operation of the method commences at Step S4000 and proceeds to Step S4100.

In Step S4100, a print command may be received from a user workstation, a remote device or other data transmitting component directed to an image forming device. Operation of the method proceeds to Step S4200.

In Step S4200, a print command may be parsed according to the commanded image arrangement for the image(s) to be produced and a commanded paper size on which to produce the image(s) in the specified arrangement. Operation of the method proceeds to Step S4300.

Step S4300 is a determination step. In Step S4300, a determination is made as to whether the commanded image arrangement matches the commanded paper size using techniques such as those described above.

If in Step S4300 the determination is made that the commanded image arrangement matches the commanded paper size, operation of the method proceeds to Step S4600 in which the print command is executed as received.

If in Step S4300 the determination is made that the commanded image arrangement does not match the commanded paper size, operation of the method proceeds to Step S4400.

In Step S4400, image forming operations in the image forming device to which the print command was directed may be inhibited. Preferably, a user will be presented with a range of executable remediation options, as discussed above. Operation of the method proceeds to Step S4500.

In Step S4500, a user selection of one of the remediation options may be received and the print command may be revised according to the user selection. Operation of the method proceeds to Step S4600.

In Step S4600, if no mismatch was detected the print command may be executed, as received, and in cases where mismatch was detected, the print command may be executed as revised according to the user selection of one of the remediation options, which may include simply canceling the print job. Operation of the method proceeds to Step S4700, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable processing environments in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by a processor. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in data computing and communicating network environments with many types of communication equipment, computer system configurations, and image forming devices. Embodiments according to this disclosure may be practiced in distributed computing, communicating and image forming environments where tasks are performed by local and remote actual and virtualized processing devices that may be linked to each other by hardwired links, wireless links, or a combination of both through a communication network. In a distributed computing/communicating environment, program modules may be located in both local and remote memory storage devices.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 4, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure. For example, the principles of the disclosure may be applied to each individual image forming device of a plurality of image forming devices operated by numerous customers at specific customer sites where individual image forming devices or groups of the image forming devices have associated with them device management applications for communication with a manufacturer or supplier. Each image forming device may include some portion of the disclosed system and execute some portion of the disclosed method but not necessarily all of the system components or method steps.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A method for identifying print command discrepancies, comprising:
   receiving, by a processor, from an image data source a print command for image forming operations to be performed in an image forming device;
   comparing, with the processor, a commanded image arrangement in the print command with a paper size commanded by the print command to determine an existence of a discrepancy;
   determining if the discrepancy includes a multi-page image per sheet output request;
   providing an executable remediation option to modify the print command when the existence of the discrepancy with the multi-page image per sheet output request is determined;
   executing a received executable remediation selection;
   revising the print command to a modified print command based on the received executable remediation selection; and
   directing, with the processor, the image forming operations in the image forming device according to the modified print command.

2. The method of claim 1, the discrepancy being a mismatch between the commanded image arrangement and the commanded paper size for an image receiving media substrate on which the image is to be formed, the determining step including determining if the discrepancy is an addressable discrepancy requiring a remediation option to modify the print command based on a detected multi-page image per sheet output request, wherein the discrepancy is not an addressable discrepancy based solely on results of the comparing step.

3. The method of claim 2, the comparing comprising causing the processor to examine the print command for an instance of n-up printing, and based on the examination, determining that the discrepancy includes a multi-page image per sheet output request.

4. The method of claim 2, the comparing comprising causing the processor to survey proposed gutter areas in the commanded image arrangement, and based on the survey, determining that the discrepancy includes a multi-page image per sheet output request.

5. The method of claim 1, further comprising inhibiting execution of the print command until the discrepancy is resolved.

6. The method of claim 1, further comprising displaying to the user at least one user-selectable option for modifying the print command when the existence of the discrepancy is determined.

7. The method of claim 6, further comprising receiving, by the processor, from the user a selection of the at least one user selectable option for modifying the print command; and
   directing, with the processor, the image forming operations in the image forming device according to the user-selected modification of the print command.

8. The method of claim 6, at least one user-selectable option for modifying the print command comprising one or more of (1) cancelling the image forming operation commanded by the print command in the image forming device, (2) splitting the commanded image arrangement into multiple individual image arrangements to be formed on correctly sized media, and (3) accepting a surcharge associated execution of the commanded image forming operation according to the received print command.

9. The method of claim 1, further comprising storing data associated with each determination of the existence of the discrepancy.

10. The method of claim 1, further comprising transmitting data associated with each determination of the existence of the discrepancy to a manufacturer or supplier remote facility.

11. The method of claim 1, the processor being associated with a device that is the source of the received print command.

12. A system for identifying print command discrepancies, comprising:
   an operating interface by which the system receives a print command from an image data source for image forming operations to be performed in an image forming device; and
   a processor that is program to compare a commanded image arrangement in the print command with a paper size commanded by the print command to determine an existence of a discrepancy,
   determine if the discrepancy includes a multi-page image per sheet output request,
   provide an executable remediation option to modify the print command when the existence if the discrepancy with the multi-page image per sheet output request is determined,
   execute a received executable remediation selection,
   revise the print command to a modified print command based on the received executable remediation selection, and
   direct the image forming operations in the image forming device according to the modified print command.

13. The system of claim 12, the discrepancy being a mismatch between the commanded image arrangement and the commanded paper size for an image receiving media substrate on which the image is to be formed, the processor determining if the discrepancy is an addressable discrepancy requiring a remediation option to modify the print command based on a detected multi-page image per sheet output request, wherein the discrepancy is not an addressable discrepancy based solely on results of the compare.

14. The system of claim 13, the processor being further programmed to examine the print command for an instance of n-up printing, and based on the examination, determining that the discrepancy includes a multi-page image per sheet output request.

15. The system of claim 13, the processor being further programmed to survey proposed gutter areas in the commanded image arrangement, and based on the survey, determining that the discrepancy includes a multi-page image per sheet output request.

16. The system of claim 12, the processor being further programmed to inhibit execution of the print command until the discrepancy is resolved.

17. The system of claim 12, further comprising a display device for displaying to the user at least one user-selectable option for modifying the print command when the existence of the discrepancy is determined, the operating interface being manipulated by the user to provide a user selection of the at least one user selectable option for modifying the print command, and the processor directing the image forming operations in the image forming device according to the user-selected modification of the print command.

18. The system of claim 17, at least one user-selectable option for modifying the print command comprising one or more of (1) cancelling the image forming operation commanded by the print command in the image forming device, (2) splitting the commanded image arrangement into multiple individual image arrangements to be formed on correctly sized media, and (3) accepting a surcharge associated execution of the commanded image forming operation according to the received print command.

19. The system of claim 12, further comprising a data storage device for storing data associated with each determination of the existence of the discrepancy.

20. The system of claim 12, further comprising an external communication interface for transmitting data associated with each determination of the existence of the discrepancy to a manufacturer or supplier remote facility.

21. A non-transitory computer readable medium having executable instructions recorded thereon that, when executed by a processor, cause the processor to execute steps of a method for identifying print command discrepancies, comprising:

receiving from an image data source a print command for image forming operations to be performed in an image forming device;

comparing a commanded image arrangement in the print command with a paper size commanded by the print command to determine an existence of a discrepancy;

determining if the discrepancy includes a multi-page image per sheet output request;

providing an executable remediation option to modify the print command when the existence if the discrepancy with the multi-page image per sheet output request is determined;

executing a received executable remediation selection;

revise the print command to a modified print command based on the received executable remediation selection; and executing the image forming operations in the image forming device according to the modified print command.

22. The non-transitory computer readable medium of claim 21, the discrepancy being a mismatch between the commanded image arrangement and the commanded paper size for an image receiving media substrate on which the image is to be formed, the determining step including determining if the discrepancy is an addressable discrepancy requiring a remediation option to modify the print command based on a detected multi-page image per sheet output request, wherein the discrepancy is not an addressable discrepancy when based solely on results of the comparing step.

* * * * *